(12) United States Patent
Wetherall et al.

(10) Patent No.: US 7,444,404 B2
(45) Date of Patent: Oct. 28, 2008

(54) NETWORK TRAFFIC REGULATION INCLUDING CONSISTENCY BASED DETECTION AND FILTERING OF PACKETS WITH SPOOF SOURCE ADDRESSES

(75) Inventors: David J. Wetherall, Seattle, WA (US);
Stefan R. Savage, Seattle, WA (US);
Thomas E. Anderson, Seattle, WA (US)

(73) Assignee: Arbor Networks, Inc., Lexington, MA (US)

( * ) Notice: Subject to any disclaimer, the term of this patent is extended or adjusted under 35 U.S.C. 154(b) by 1649 days.

(21) Appl. No.: 09/777,550

(22) Filed: Feb. 5, 2001

(65) Prior Publication Data

US 2002/0107960 A1    Aug. 8, 2002

(51) Int. Cl.
| | |
|---|---|
| *G06F 15/173* | (2006.01) |
| *G06F 7/04* | (2006.01) |
| *G06F 17/30* | (2006.01) |
| *G06F 7/58* | (2006.01) |
| *G06F 15/16* | (2006.01) |
| *G06K 9/00* | (2006.01) |
| *H04L 9/32* | (2006.01) |
| *H04L 12/28* | (2006.01) |

(52) U.S. Cl. .................. 709/225; 709/223; 709/224; 709/238; 709/240; 726/2; 726/3; 726/4; 726/11; 726/12; 726/13

(58) Field of Classification Search ............ 709/223, 709/224, 225, 238, 240; 713/200, 201
See application file for complete search history.

(56) References Cited

U.S. PATENT DOCUMENTS

| | | | | |
|---|---|---|---|---|
| 4,115,657 | A | 9/1978 | Morgan | 380/116 |
| 6,321,336 | B1 | 11/2001 | Applegate et al. | 713/201 |
| 6,321,338 | B1 * | 11/2001 | Porras et al. | 709/224 |
| 6,327,242 | B1 * | 12/2001 | Amicangioli et al. | 370/216 |
| 6,691,232 | B1 * | 2/2004 | Wood et al. | 713/201 |
| 2002/0023174 | A1 | 2/2002 | Garrett et al. | 709/245 |
| 2002/0032774 | A1 | 3/2002 | Kohler, Jr. et al. | 709/225 |
| 2002/0035683 | A1 | 3/2002 | Kaashoek et al. | 713/154 |

\* cited by examiner

*Primary Examiner*—John Follansbee
*Assistant Examiner*—Hassan Phillips
(74) *Attorney, Agent, or Firm*—Houston Eliseeva LLP

(57) ABSTRACT

A director is provided to receive source address instances of packets routed through routing devices of a network. The director determines whether any of the reported source address instances are to be deemed as spoof source address instances. The director further determines where filtering actions are to be deployed to filter out packets having certain source addresses deemed to be spoof instances. The director makes its determinations based at least in part on a selected one of a number of consistency measures. The consistency measures may include but are not limited to spatial consistency, destination consistency, migration consistency, and temporary consistency. The consistency measures are evaluated using spatial, destination source address range, migration and timing S/D/M/T distribution profiles of the reported source addresses. In some embodiments, the determinations are based further in view of reference S/D/M/T distribution profiles, which may be an exemplary S/D/M/T distribution profile of a typical non-spoof source address or a historical S/D/M/T distribution profile of the source address.

45 Claims, 14 Drawing Sheets

NETWORK TRAFFIC REGULATION INCLUDING CONSISTENCY BASED DETECTION AND FILTERING OF PACKETS WITH SPOOF SOURCE ADDRESSES

BACKGROUND OF THE INVENTION

1. Field of the Invention

The present invention relates to the field of networking. More specifically, the present invention relates to network management techniques associated with fending off undesirable network traffic.

2. Background Information

With advances in integrated circuit, microprocessor, networking and communication technologies, increasing numbers of devices, in particular, digital computing devices, are being networked together. Devices are often first coupled to a local area network, such as an Ethernet based office/home network. In turn, local area networks are interconnected together through wide area networks, such as ATM networks, Frame Relays, and the like. Of particular interest is the TCP/IP based global inter-networks, Internet.

As a result of this trend of increased connectivity, increasing numbers of applications that are network dependent are being deployed. Examples of these network dependent applications include but are not limited to, email, net-based telephony, world wide web and various types of e-commerce. For these applications, success inherently means a high volume of desirable network traffic for their implementing servers. To ensure continuing success, quality of service through orderly and efficient handling of the large volume of desirable network traffic has become of paramount importance. Various subject matters, such as scalability, distributive deployment and caching of contents as well as regulating network traffic destined for a network node, have become of great interest to the artesian.

Unfortunately, success also may mean attracting undesirable network traffic designed to disrupt or completely shut down the services offered by the implementing servers. To ensure continuing success, the ability to fend off undesirable network traffic, also known as fending off denial of service (DoS) attacks, has also become of great importance. Various subject matters, including detection and filtering of packets with spoof source addresses, have too become of great interest to the artesian.

However, to-date, there is no known effective approach to detecting and filtering out packets with spoof source addresses. What is particularly difficult about detecting and filtering out packets with spoof source addresses is the fact that often times spoof instances are intermixed with non-spoof instances. For example, source address 128.128.128.16 may be an authentic source address, but it is also one of the spoof addresses employed by a denial of service attacker. As a result, while" most likely an overwhelming majority of the packets with this source address are spoof instances, there could still be a significant number of packets with this source address that are non-spoof instances.

Prior art spoof address detection and filtering techniques basically fall into two categories, (a) ingress filtering and (b) traceback schemes. Ingress filtering consists of checking the validity of source addresses as they enter a network. But, the approach is effective only at stopping spoofed packets near their sources. Moreover, the technique requires the valid source address range to be succinctly described to the filtering routers. Traceback schemes have recently been proposed in the literature to trace floods of traffic backward across networks. Examples of these proposed techniques include an earlier technique jointly proposed by the inventors of the present application and others to identify the source of attack packets through reconstruction of the routing paths from packets with partial routing path information, and a special message based technique currently under investigation by the Internet Engineering Task Force (IETF).

The former technique calls for the probabilistic marking of packets with partial routing path information by the victim. It is assumed from a moderate size sample of packets with partial routing path information, the source of the attack may be inferred (and accordingly packets with spoofed addresses may be recognized). For further details, see Practical Network Support for IP Traceback by Savage et al., Dept. of Computer Science and Engineering, University of Washington, Seattle, Wash., Technical Report UW-CSE-00-02-01. The later technique calls for the support of a new type of routing path message by routers, which are to broadcast these new special routing path messages randomly. Presumably, from a collection of these randomly broadcast routing path messages, one would also be able to infer the source of attack (thus implicitly recognizing the source addresses of the attack packets as spoof addresses). For further details, see IETF Internet-Drafts—ICMP Traceback Messages by S. M. Bellovin, March 2000.

SUMMARY OF THE INVENTION

The present invention provides for a method and apparatus for fending off denial of service attacks and assisting in ensuring the quality of service provided by network nodes of a managed network. More specifically, the present invention provides for a method and apparatus for removing undesirable network traffic in the managed network, through consistency based detection and filtering out packets with spoof source addresses.

A director is provided to receive source address instances of packets routed through routing devices of a network. The director determines whether any of the reported source address instances are to be deemed as spoof source address instances. The director further determines where filtering actions are to be deployed to filter out packets having certain source addresses deemed to be spoof instances.

The director makes its determinations based at least in part on a selected one of a number of consistency measures. The consistency measures may include but are not limited to, spatial consistency, destination consistency, migration consistency, and temporal consistency. The consistency measures are evaluated using spatial, destination source address range, migration, and timing (S/D/M/T) distribution profiles of the reported source addresses. In some embodiments, the determinations are based further in view of reference S/D/M/T distribution profiles. In one embodiment, the reference S/D/M/T distribution profile is an exemplary S/D/M/T distribution profile of a typical non-spoof source address, while in another embodiment, it is a historical S/D/M/T distribution profile of the source address. In various embodiments, all or portions of the packets with source addresses having S/D/M/T distribution profiles that do not substantially resemble the reference S/D/M/T distribution profiles are deemed to be packets with spoof source addresses.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a processor based device, using terms such as requesting, reporting, determining, data, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. The terms "routing device", and "route" are used throughout this application, in the claims as well as in the specification. The terms as used herein are intended to have a broader meaning than its normal plain meaning as understood by those ordinarily skilled in the networking art. They are intended to be genus terms that include the conventional routers and conventional routing and forwarding, as well as all other variations of network trafficking, such as, switches or switching, gateways, hubs and the like. Thus, unless particularized, the terms are to be given this broader meaning. Further, the description repeatedly uses the phrase "in one embodiment", which ordinarily does not refer to the same embodiment, although it may.

Overview

Figure 1:
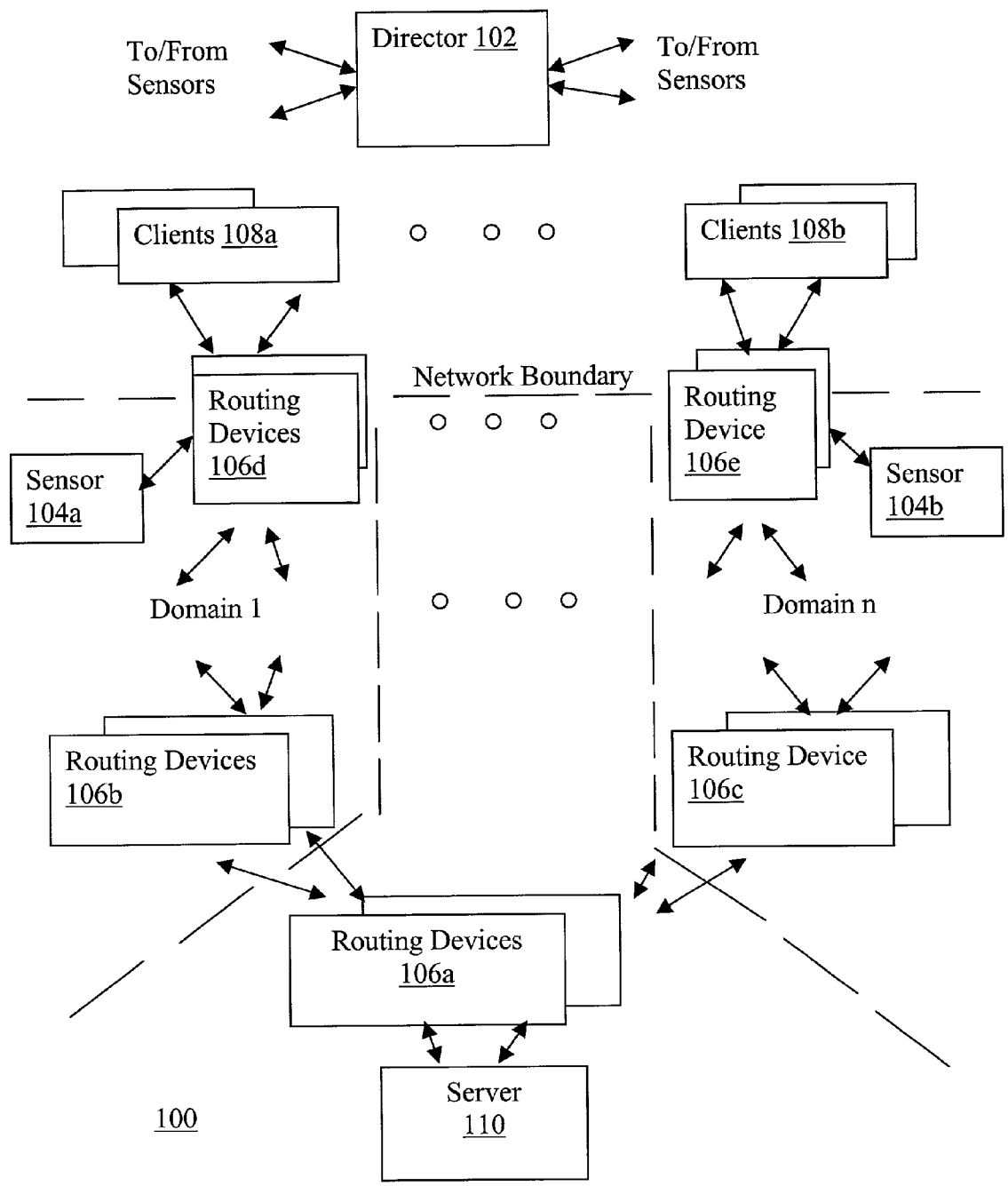
FIG. 1 illustrates a network view of the present invention, including a number of distributively deployed sensors and a director, in accordance with one embodiment.
Figure 2:
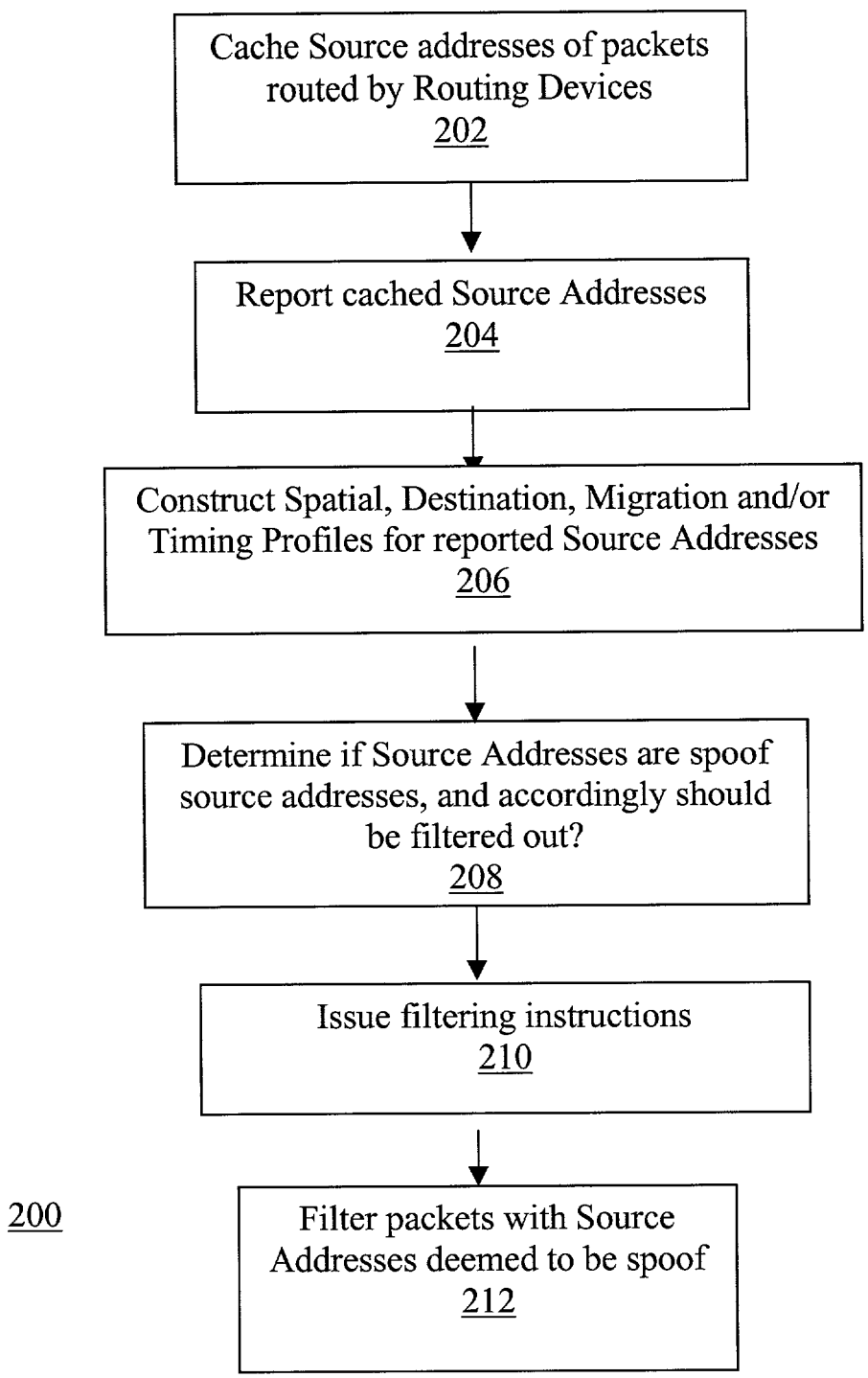
FIG. 2 illustrates a method view of the same invention, in accordance with one embodiment.

Referring now first to FIGS. 1-2, wherein two block diagrams illustrating a network view and a method view of the present invention, in accordance with one embodiment are shown. As illustrated in FIG. 1, in accordance with the present invention, network 100 is provided with director 102 to assist in fending off undesirable network traffic destined for a network node of network 100, such as server 110, to assist in ensuring quality of service provided by the network node. More specifically, director 102 detects packets with spoof source addresses, and determines whether filtering actions are to be deployed to filter out such packets from network 100. Director 102 advantageously performs the detection and determination, based at least in part on one or more consistency measures.

In various embodiments, director 102 evaluates these consistency metrics using spatial, destination source address range, migration and timing (S/D/M/T) distribution profiles. Director 102 constructs and compares the SDMT distribution profiles to reference SDMT distribution profiles of the source addresses. In one embodiment, the reference SDMT distribution profiles are exemplary SDMT distribution profiles for non-spoof source addresses in general. In another embodiment, the reference SDMT distribution profiles are historical SDMT distribution profiles for specific source addresses.

In various embodiments, director 102 evaluates these consistency using spatial, destination source address range, migration and timing (SDMT) distribution profiles. Director 102 constructs and compares the SDMT distribution profiles to reference SDMT distribution profiles of the source addresses. In one embodiment, the reference SDMT distribution profiles are exemplary SDMT distribution profiles for non-spoof source addresses in general. In another embodiment, the reference SDMT distribution profiles are historical SDMT distribution profiles for specific source addresses.

In various embodiments, such as the illustrated embodiment, a number of sensors, such as sensors 104a-104b, are distributively disposed to gather and report on source address instances of packets routed by routing devices of various domains of network 100. For the illustrated embodiment, sensors 104a-104b are distributively disposed to gather and report on source address instances of packets routed by routing devices 106d-106e disposed at the boundary entry points into network 100. Employment of distributively disposed sensors, in conjunction with one or more directors, to regulate network traffic is the subject matter of U.S. Patent Application, Ser. No. 09/631,898 (Express Mail number EL431686806US), entitled "A Distributed Solution for Regulating Network Traffic", filed on Aug. 4, 2000, having at least partial common inventorship with the present invention. The application is hereby fully incorporated by reference.

Network 100 is intended to represent a broad range of private as well as public networks or interconnected networks, such as the network of an Internet Service Provider (ISP), the enterprise network of a multi-national corporation, or the Internet. Networking nodes, such as clients 108a-108b and server 110 are coupled to each other through routing devices 106a-106e. As disclosed earlier, routing devices 106a-106e are intended to represent a broad range of network trafficking equipment, including but not limited to conventional routers, switches, gateways, hubs and the like.

For the illustrated embodiment, sensors 104a-104b are externally disposed and correspondingly coupled to monitor multiple routing devices 106d-106e. In alternate embodiments, sensors 104a-104b may be correspondingly coupled to monitor and report on the network traffic routed through a single routing device. In yet other embodiments, sensors 104a-104b may even be integrally disposed within routing devices 106d-106e instead. Sensors 104a-104b, whether externally disposed or integrally disposed, are additionally coupled to director 102. The coupling may be made using any one of a number of communication links known in the art, such as modem links over conventional phone lines, serial communication lines, parallel communication lines, Digital Subscriber Lines (DSL), Integrated Service Digital Network (ISDN) connections, Asynchronous Transfer Mode (ASM) links, Frame Relay connections, Ethernet, IP networks, packet-switched wireless networks, and the like.

While for ease of understanding, only one director 102, and a handful each of network nodes, clients 108a-108b and server 110, routing devices 106a-106e and sensors 104a-104b are included in the illustration, from the description to follow, those skilled in the art will appreciate that the present invention may be practiced with more than one director (or director device) 102 as well as more or less network nodes, routing devices 106a-106e and sensors 104a-104b. If more than one director/director device 102 is employed, each director/director device 102 may be assigned responsibility for a subset of sensors 104a-104b, and the directors may relate to each other in a master/slave relationship, with one of the directors serving as the "master" (and the others as "slave"), or as peers to one another or organized into an hierarchy.

As illustrated in more details in FIG. 2, in accordance with the present invention, at block 202, source address instances of packets routed through routing devices of network 100 being monitored, such as routing devices 106d-106e, are gathered and cached, e.g. by sensors 104a-104b.

At block 204, the gathered and cached source address instances of the packets routed are reported, e.g. to director 102. In various embodiments, e.g. where a relatively small number of distributively disposed sensors are employed in conjunction with director 102, all sensors report to director 102, either periodically at predetermined time intervals or in response to specific requests of director 102. In other embodiments, e.g. where a substantial number of distributively disposed sensors are employed, director 102 periodically selects and requests a subset of the employed sensors to report (e.g. a randomly selected subset). The reported source addresses are in turn relayed to the non-selected (i.e. non-reporting) sensors, which in turn "echoes" whether the non-selected/reporting sensors also observed packets with the reported source addresses being routed by their corresponding routing devices (similar to the reporting whether there was a "cache hit" or "cache miss"). In one embodiment, the "echoing" includes the frequency of observation of the source addresses. Director 102 repeats this process from time to time, in accordance to a predetermined pattern or a random pattern. Different subsets of sensors may be requested to report each time. This later "two trips" approach advantageously reduces the volume of reporting data when substantial number of sensors are employed.

In any event, at block 206, a spatial, a destination source address range, a migration, and/or a timing profile is constructed (e.g. by director 102) for each of the reported source addresses. At block 208, a determination is made (e.g. by director 102), based at least in part on the constructed (S/D/M/T) profile, on whether any of the reported source addresses should be deemed as having spoof source address instances. In various embodiments, if the determination is made based at least in part of a source address's spatial distribution profile, the determination is made further in view of one or more reference spatial distribution profiles. In other embodiments, if the determination is made based at least in part on a destination source address range profile at a location routing packets of a source address of interest, the determination is made further in view of one or more reference destination source address range distribution profiles. In yet other embodiments, if the determination is made based at least in part on a migration profile, the determination is made further in view of one or more reference migration distribution profiles. In other embodiments, if the determination is made based at least in part of a source address's timing distribution profile, the determination is made further in view of one or more reference timing distribution profiles. In various embodiments, the one or more reference spatial/destination/migration/timing (S/D/M/T) distribution profiles include an empirically derived exemplary S/D/M/T distribution profile of a non-spoof source address in general. In other embodiments, the one or more reference S/D/M/T distribution profiles include a historical S/D/M/T distribution profile of a known non-spoof source address.

The present invention contemplates that the determination is made for most source addresses based on an exemplary reference S/D/M/T distribution profile for a non-spoof source address in general. The determination is made using historical S/D/M/T distribution profiles only for a minority number of known non-spoof source addresses, such as known non-spoof source addresses of certain "premium" clients of the network node being "protected".

Figure 13A:
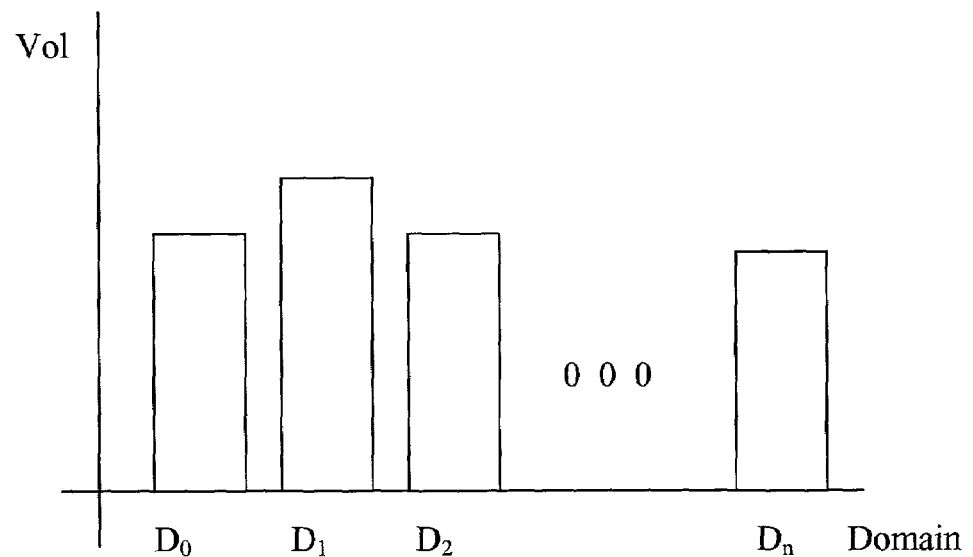
FIGS. 13a-13d illustrate one embodiment each of a spatial distribution profile, a destination source address range distribution profile, a migration distribution profile, and a timing distribution profile of a source address.
Figure 13B:
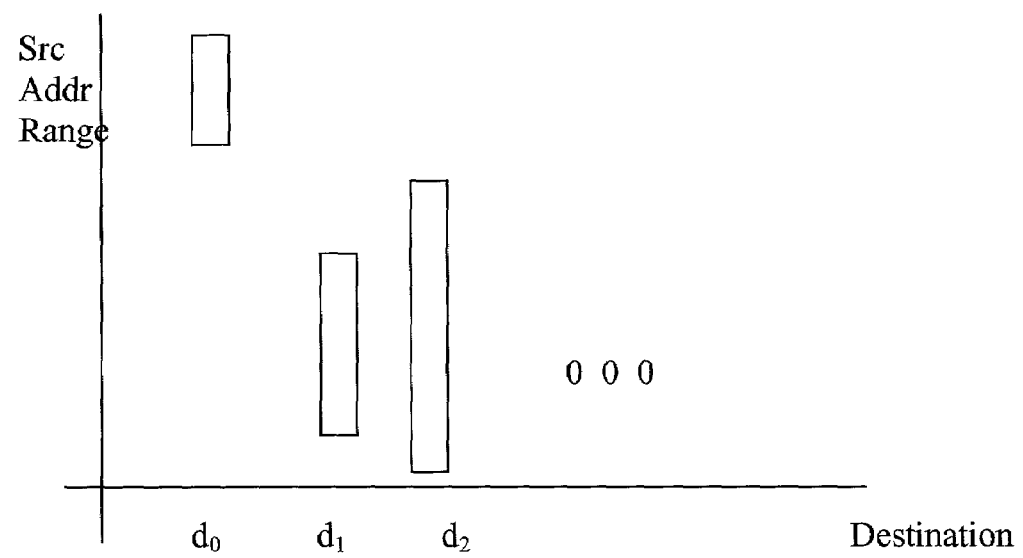
Figure 13C:
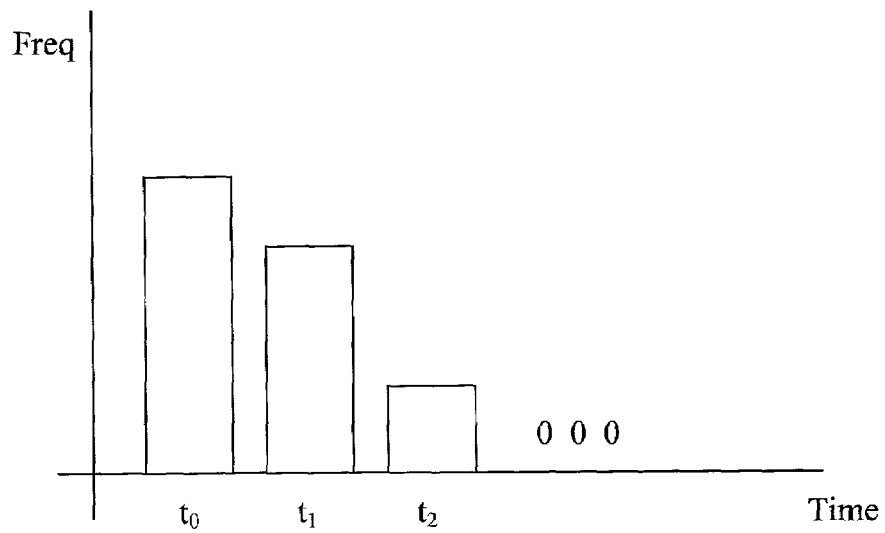
Figure 13D:
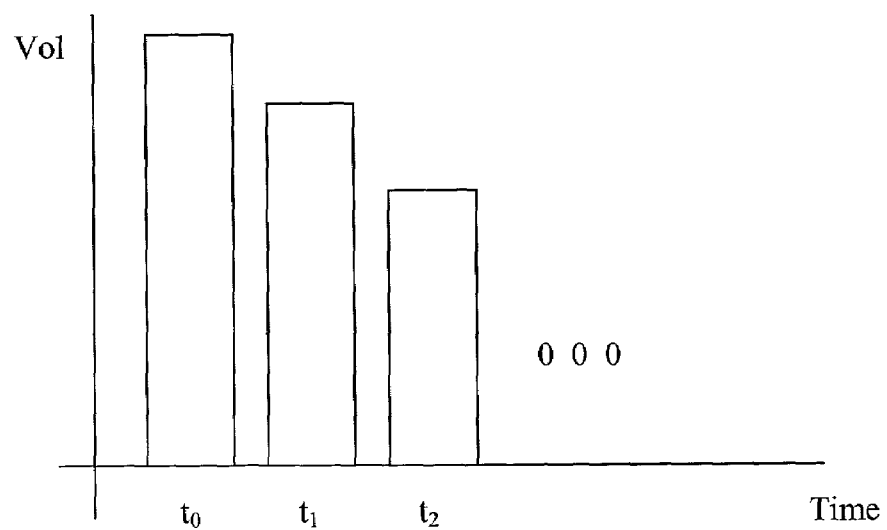

Skipping briefly to FIG. 13a-13d and FIG. 14a-14d, FIG. 13a-13b illustrate one each of an example spatial and an example "destination" distribution profile of a source address having spoof instances. Experience has shown that if spoof source addresses are employed in a denial of service attacks against a network node, it is likely that the source addresses will be simultaneously observed in multiple domains of network 100, even domains that are geographically dispersed, as illustrated by the histogram of FIG. 13a. Similarly, if spoof source addresses are employed in a denial of service attacks against a network node, it is likely that the spoof source addresses will not be a subset or substantially related to the source addresses of other packets being routed to other destinations at the routing location, as illustrated by FIG. 13b, where the destinations have disjointed source address ranges for the various destinations of the packets being routed at the routing location. Further, if spoof source addresses are employed in a denial of service attacks against a network node, it is likely that the spoof source addresses will be migrating across different network domains in a very rapid rate, i.e. the routing paths change from one network domain to another relatively quickly, as illustrated by FIG. 13c, having a high number of incidence with short timing duration between routing path changes. Lastly, if spoof source addresses are employed in a denial of service attacks against a network node, it is likely that the source addresses will be repeatedly observed within a very short interval as illustrated by the histogram of FIG. 13d, having an exponentially decay type of profile (in terms of elapsed time between packets with the same source address).

Figure 14A:
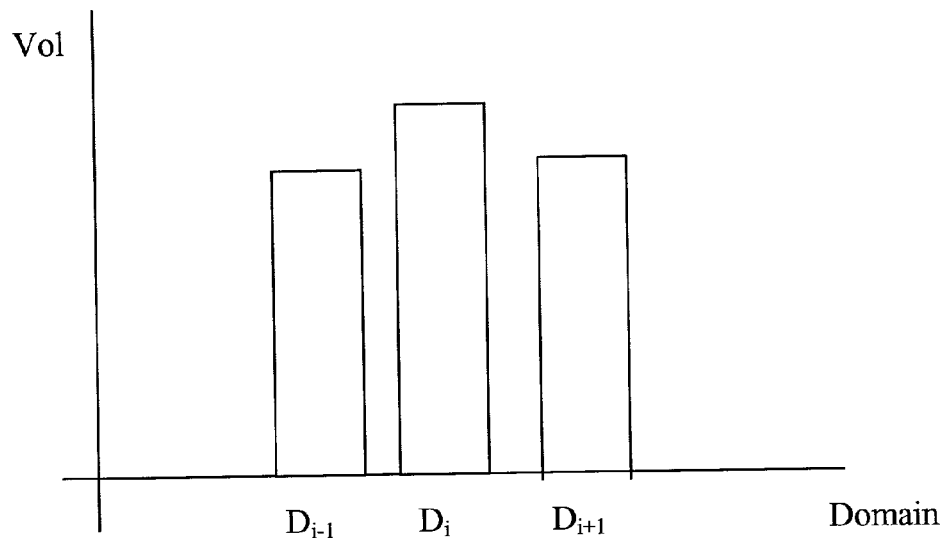
FIGS. 14a-14d illustrate one embodiment each of a reference spatial distribution, a reference destination source address range distribution profile, a reference migration profile, and a reference timing distribution profile of a source address.
Figure 14B:
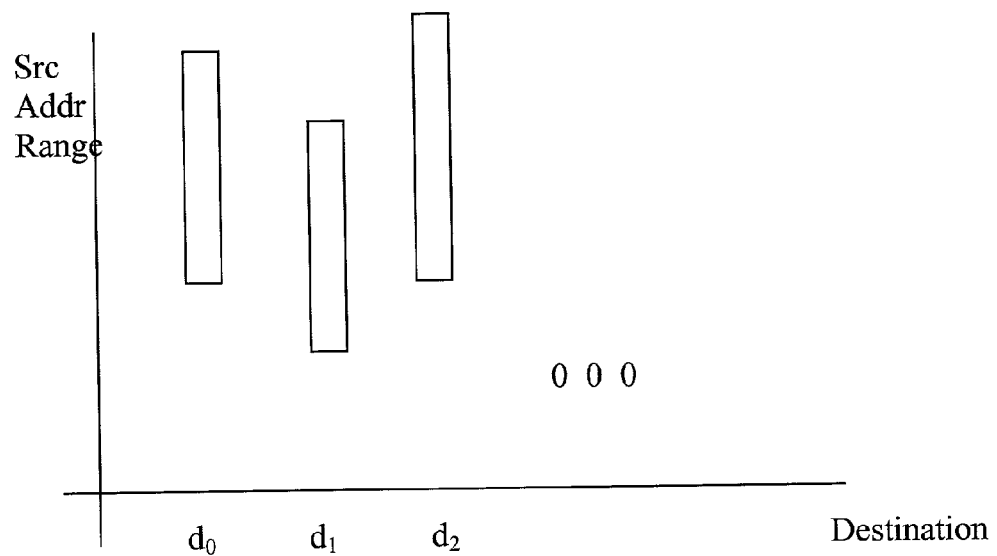
Figure 14C:
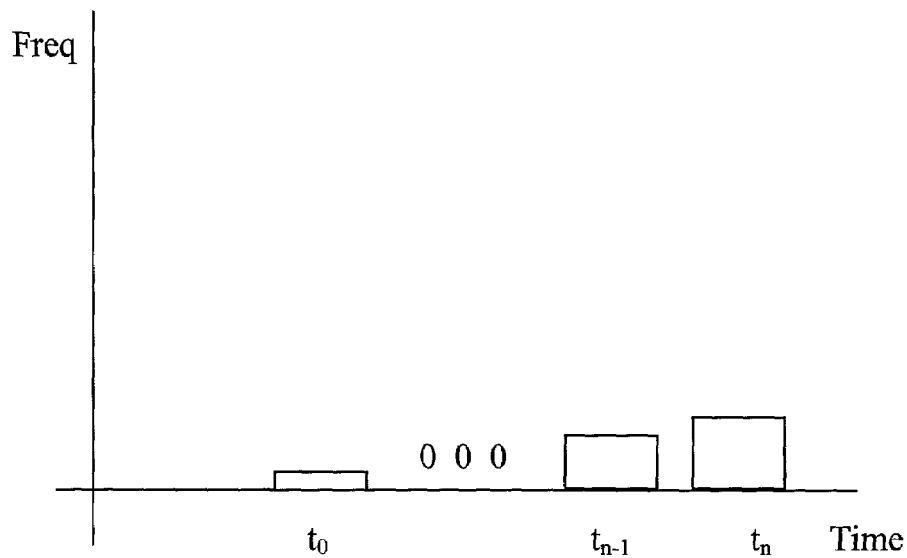
Figure 14D:
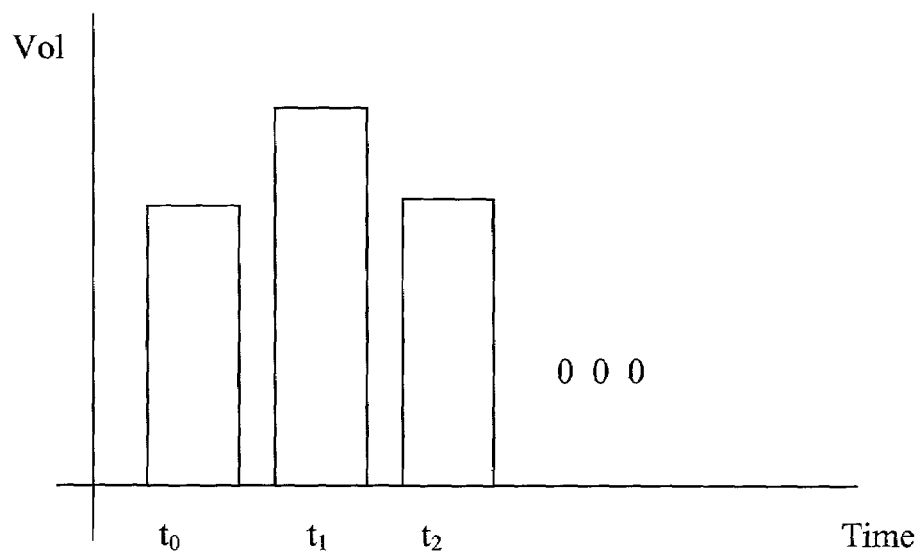

These characteristics are likely to be different from that of non-spoof source addresses, where spatially, they tend to distribute normally over a domain and its "immediately" adjacent domains, as illustrated by FIG. 14a; and from a destination source address range perspective, they tend to be subset of, or substantially related to source addresses of other packets being routed to other destinations at the routing location, as illustrated by FIG. 14b. From a migration perspective, the number of incidents having short duration between routing path changes should be very low, as illustrated by FIG. 14c, and from a timing perspective, they too tend to distribute normally over a mean arrival time, as illustrated by FIG. 14d. In addition to being representative of spatial, destination source address range, migration, and timing distribution profiles of a non-spoof source address in general, the S/D/M/T distribution profiles illustrated in FIG. 14a-14d may be actual spatial, destination source address range, migration and timing distribution profiles (historically compiled) of a source address. Such historical profiles may e.g. be compiled for certain premium service clients, as alluded to earlier. Compilation of these exemplary/actual profiles may be performed using any number of statistic gathering techniques known in the art.

Thus, a decision maker, such as director 102, may infer whether an observed source address is to be deemed as having spoof source address instances based on whether the observed S/D/M/T distribution profile of the source address substantial resembles that of a reference S/D/M/T distribution profile or not. Substantial resemblance may be quantitatively determined using any one of a number of known statistical techniques, e.g. the least square fitness test. The threshold for inferring a source address as having spoof source address instances is application dependent, depending on whether for a particular network node, it is more suitable to err on the side of incorrectly inferring a non-spoof source address as having spoof source address instance, or it is more suitable to err on the side of failing to detect some of the spoof source address instances. The former preference will tend to lead to over filtering, rejecting more packets than necessary, while the later preference will tend to lead to under filtering, resulting in more undesirable packets to "hit" the network node.

Referring now back to FIG. 2, at block 210, once a source address having spoof instances is detected, appropriate filtering instructions are formulated and issued to filter out the undesirable packets from network 100. In various embodiments, blanket filtering instructions are issued to all boundary routing devices 106d-106e (e.g. through sensors 104a-104b). For these embodiments, packets with non-spoof instances will also be filtered out. [In some embodiments, filtering instructions are "manually" applied to boundary routing devices by operators.] Depending on the nature of the services offered by the network node to be "protected", and the potential implication to its quality of service, this blanket filtering action may nevertheless be an appropriate response. In other embodiments, e.g. where the most likely routing domains of a non-spoof source address is known, such as in the earlier described situation where historical spatial distribution profiles are available, filtering instructions are issued to all boundary devices 106d-106e, except those leading into the known most likely routing domains.

At block 212, the instructed routing devices filter out packets with source addresses deemed to be having spoof instance as instructed. In various embodiments, the filtering instructions are typically issued for finite duration of time, such that the need for issuing filtering cessation instructions may be avoided. Issuing filtering instructions for a finite duration of time also has the effect of containing the over filtering effect of overly aggressive filtering actions, such as the earlier described blanket filtering by all boundary routing devices. In these embodiments, the routing devices filter out packets with the specified source addresses for the specified time duration as instructed.

Those skilled in the art will appreciate that the present invention provides for a practical and substantially more effective approach to addressing the spoof source address problem. In particular, the present invention is scalable to allow a network administrator to take more or less risk, as the application may call for.

Sensors

Figure 3:
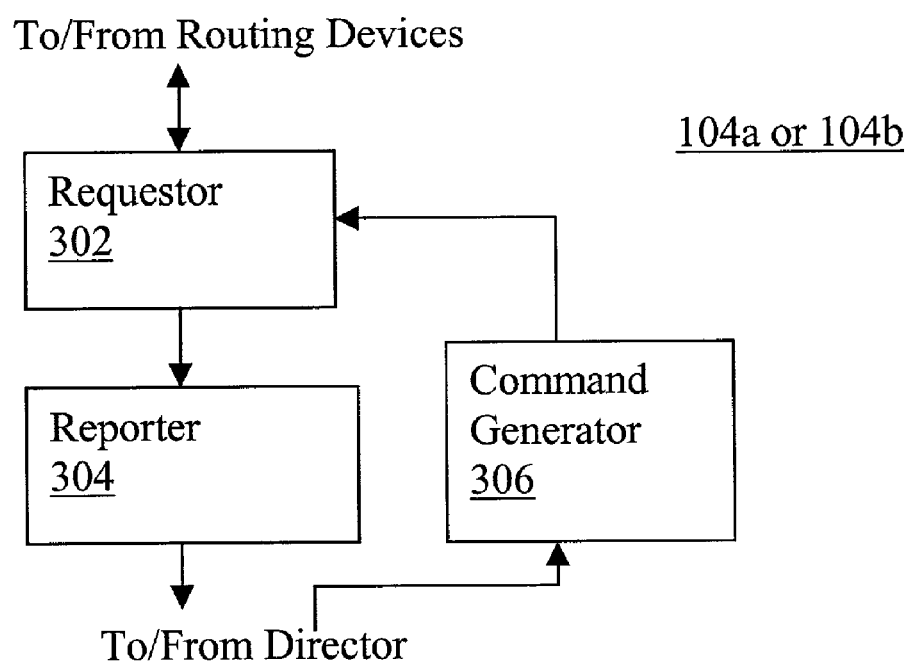
FIG. 3 illustrates a functional view of a sensor, in accordance with one embodiment.

FIG. 3 illustrates a functional view of a sensor, in accordance with one embodiment. The embodiment assumes the sensor is externally disposed, outside of its responsible routing device or devices. As illustrated, sensor 104a or 104b includes requestor function 302, reporter function 304 and command generation function 306 operatively coupled to each other as shown. Requestor function 302 is used to request a routing device or devices for source addresses of packets routed through the routing device or devices, along with the supporting data necessary for the consistency measures employed. In one embodiment, the supporting data include in particular, the time the packets were routed. The request/requests may be made periodically, on demand or in response to some event. The request/requests may be made using any one of a number of communication protocols known in the art. Requestor 302 is also used to request a routing device or devices to filter out packets with certain source addresses which are deemed to be undesirable packets with spoof instances. The filtering request commands are typically made as a result of filtering instructions provided by director 102. Similarly, the commands may be provided to the routing device or devices via any one of a number of communication protocols known in the art.

Reporter function 304 is used to report the gathered source address instances and the supporting data for the consistency measures. In addition to the supporting data gathered from the monitored routing device, the reported support data may also include spatial and other data associated with the reporting sensor (if not earlier made known). More specifically, reporter function 304 reports the gathered source address instances and the supporting data to director 102. The report may be made periodically, on demand, or in response to some event, such as at the request of director 102. The report may be made in any one of a number of formats, via any one of a number of communication protocols known in the art.

Command generation function 306 generates the specific commands for the routing device or devices, responsive to the filtering instructions received from director 102.

Figure 4:
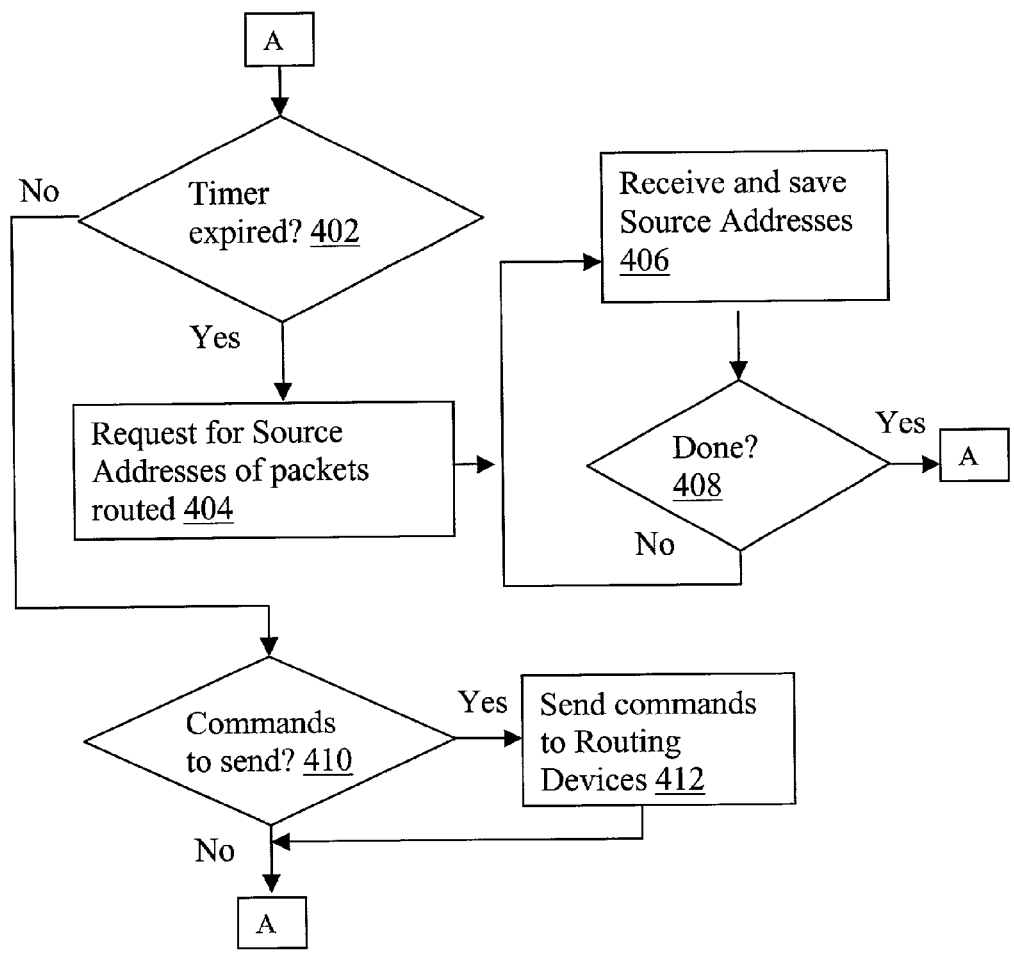
FIGS. 4-6 illustrate the operational flow of the relevant aspects of the requestor, reporter and command generation functions of FIG. 3, in accordance with one embodiment each.
Figure 5:
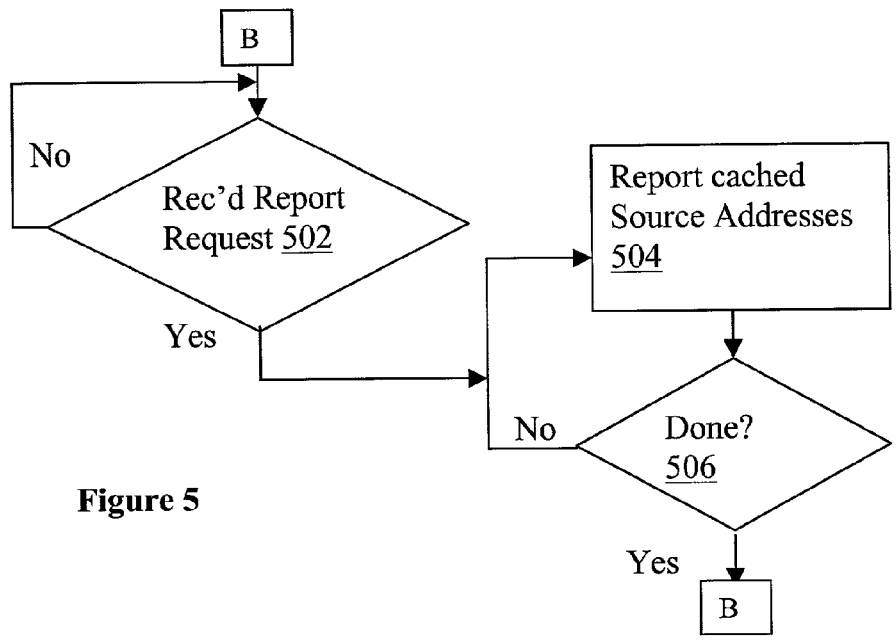
Figure 6:
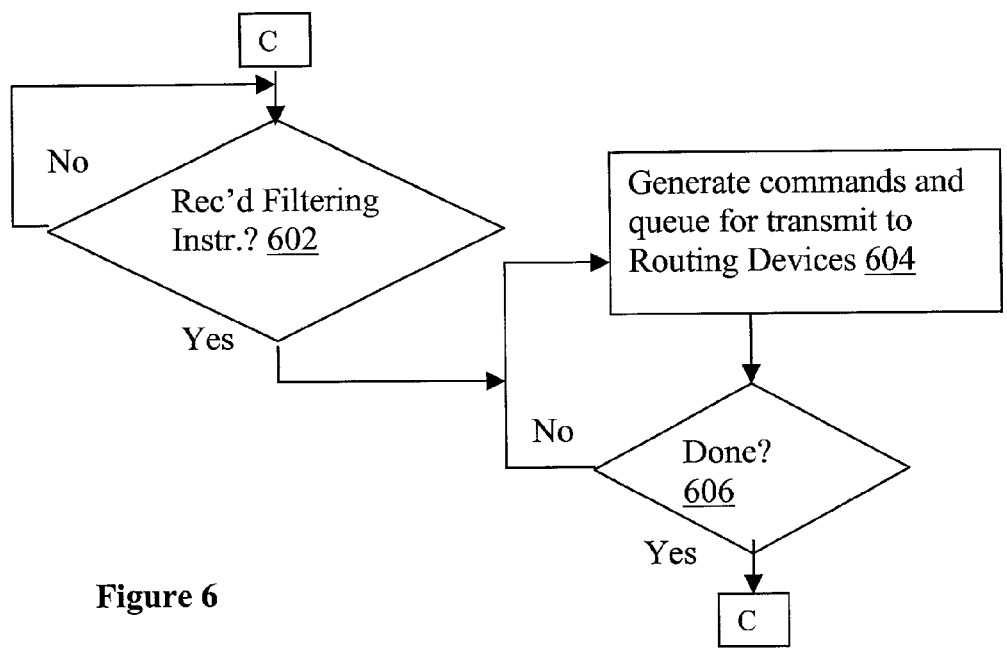

FIGS. 4-6 illustrate the operation flow of the relevant aspects of request function 302, report function 304 and command generation function 306, in accordance with one embodiment each. For request function 302, as illustrated in FIG. 4, upon start up, it awaits expiration of a timer, block 402. The periodicity of expiration is application dependent. Upon expiration of the timer, at block 404, request function 302 requests its responsible routing device or devices for source addresses of packets routed by the routing device or devices. The request may be for all network nodes, for particular network nodes of interest. At blocks 406 and 408, request function 302 caches the source addresses provided, including their frequency of observations. Upon completion of the source address transfer, requestor function 302 returns to block 402. However, if timer has not expired, block 402, request function 302 determines if any filtering commands are to be sent to its responsible routing device or devices, block 410. If there are commands queued awaiting transmission to the routing device or devices, request function 302 dequeues and sends the commands to the routing device or devices accordingly, block 412. Upon sending the commands, request function 302 returns again to block 402.

For report function 304, as illustrated in FIG. 5, in like manner, upon start up, it awaits the expiration of a timer, block 502. Likewise, the periodicity of expiration is application dependent. Upon expiration, i.e. time for reporting, report function 304 reports all or a predetermined subset (e.g. the most frequently observed subsets) of cached source addresses to director 102, as earlier described, blocks 504-506. Upon transmission report function 304 returns to block 502.

For command generation function 306, as illustrated in FIG. 6, upon start up, it awaits for filtering instructions from director 102, block 602. Upon receipt of filtering instructions, command generation function 306 generates the appropriate commands for the particular routing device or devices the sensor is responsible for, and queues the commands for transmission to the routing device or devices, as alluded to earlier. Upon generating and queuing the appropriate commands, function 306 returns to block 602 to await additional filtering instructions from director 102.

Figure 7:
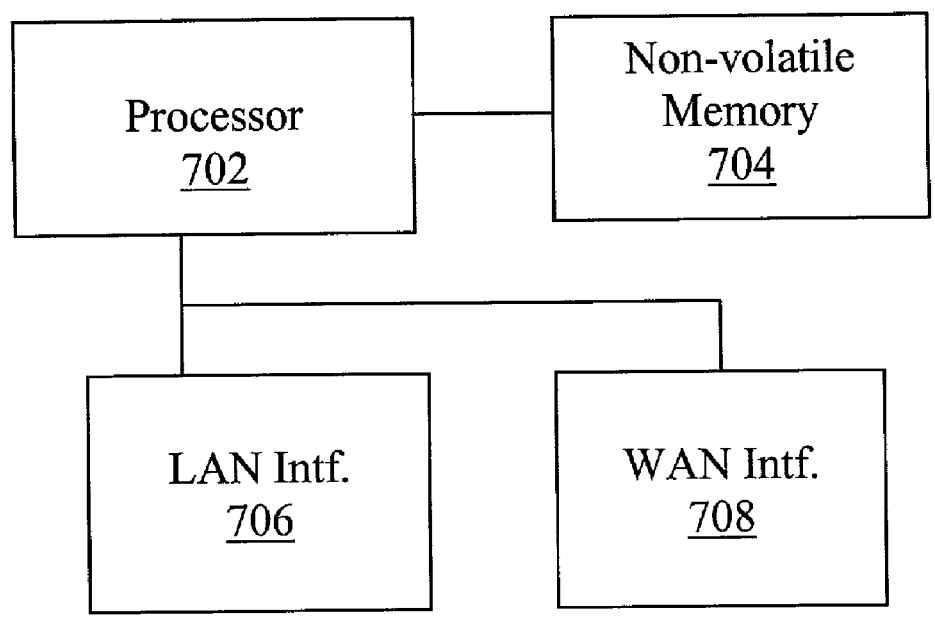
FIG. 7 illustrates an architectural view of a sensor, in accordance with one embodiment.

FIG. 7 illustrates an architectural view of a sensor, in accordance with a hardware/firmware implementation. As illustrated, sensor 700 includes processor 702, non-volatile memory 704, LAN and WAN interfaces 706 and 708. Processor 702 and non-volatile memory 704 are intended to represent a broad range of these elements known in the art. In the case of processor 702, it may be any 8-bit/16-bit microcontrollers, or 16-bit/32-bit digital signal processors, or even more powerful general purpose microprocessors known in the art. Non-volatile memory 704 may be EEPROM, Flash memory or other memory of the like. Non-volatile memory 704 is employed to store the firmware implementing the earlier described request, report and command generation functions of sensor 700, and for the embodiment, facilitates these functions execution in place. LAN interface 706 may be an Ethernet, Token Ring or other LAN interfaces of like kind, and WAN interface 708 may be a modem, or an ISDN adapter and the like.

In an alternate embodiment, request, report and command generation functions 302-306 of FIG. 3, may be implemented in software via high level languages such as C, and the software implementation may be hosted by a computing device near its responsible routing device(s), provided the hosting computing device is properly equipped with the appropriate communication interfaces to communicate with its responsible routing device(s), and director 102.

In yet other embodiments, as alluded to earlier, request, report and command generation functions 302-306 of FIG. 3, may be incorporated as an integral part of its responsible routing device. In these embodiments, instead of gathering the source addresses via request/reply transaction conducted over a communication protocol, request function 302 may directly gather the source addresses, such as via direct memory access (DMA) operations, accessing the appropriate internal storage units of the routing device. Similarly, in lieu of generating commands designed for a command interface, command generation functions may directly invoke the applicable routing device routines to cause the filtering operation to be effectuated instead.

Director

Figure 8:
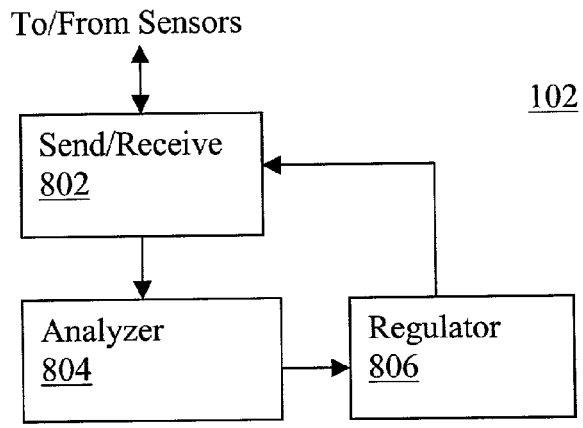
FIG. 8 illustrates a functional view of a director, in accordance with one embodiment.

Referring now to FIG. 8, wherein a functional view of the director, in accordance with one embodiment is shown. As illustrated, director 102 includes send/receive function 802, analyzer 804, and regulator 806, operatively coupled to each other as shown. Send/receive function 802 is employed to receive source addresses of packets routed by selected routing devices of network 100 (e.g. from the distributively disposed sensors), and to send filtering instructions to the appropriate routing devices (e.g. through the distributively disposed sensors). Analyzer 804 analyzes the received source addresses to determine if the source addresses are to be deemed as having spoof instances, and alerts regulator 806 accordingly. In one embodiment, analyzer 804 determines whether source addresses are to be deemed as having spoof instances using the earlier described S/D/M/T distribution profiles. Regulator 806 is used to determine the location or locations of filtering, i.e. the routing devices to perform the filtering operations, as described earlier.

Figure 9:
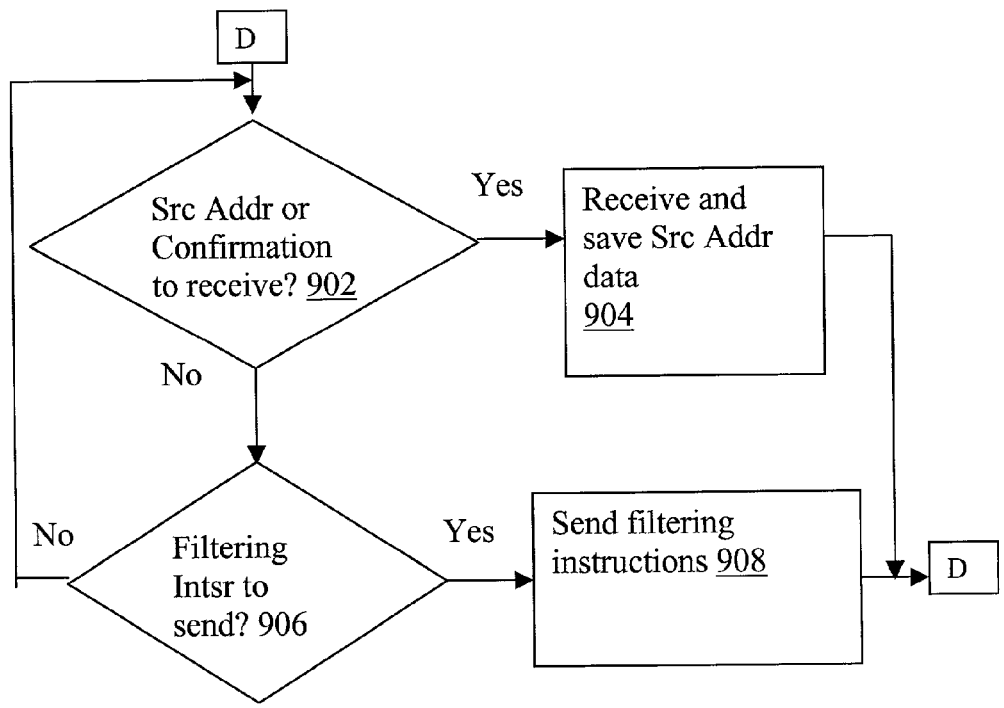
FIGS. 9-11 illustrate the operational flow of the relevant aspects of the send/receive, analyzer and regulator functions of FIG. 8, in accordance with one embodiment each.
Figure 10:
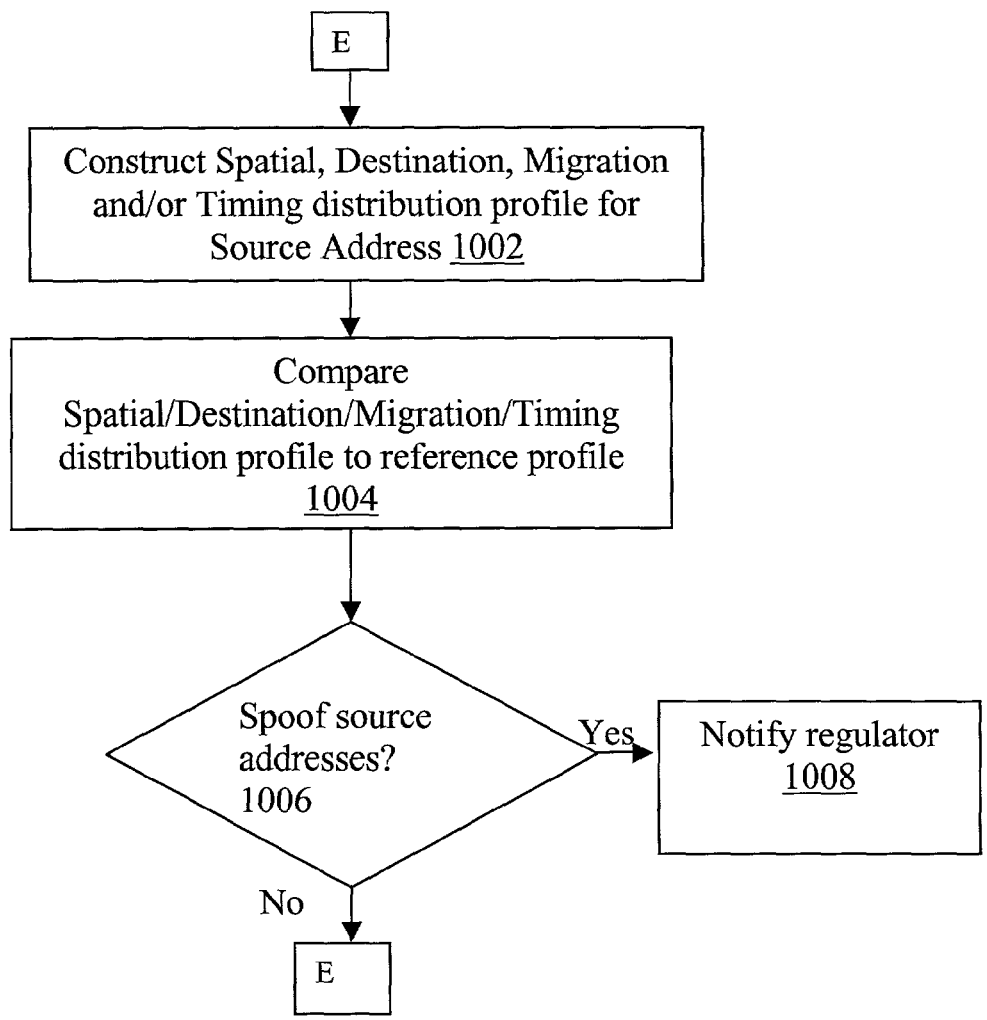

FIGS. 9-10 illustrate the operational flow of the relevant aspects of the send/receive, analyzer and regulation functions 802-806, in accordance with one embodiment each. As illustrated in FIG. 9, for the send/receive function, upon start up, it determines if there are source addresses to be received (e.g. from the sensors), block 902. If there are, send/receive function 802 receives the source addresses being reported accordingly. Recall from earlier description, send/receive function 802 may be receiving direct reporting from all reporting sources (e.g. all sensors), or may be receive direct reporting from some, and confirmation or "echoing" from others (in a two part approach to reduce the volume of data traffic).

If there are no source address data to be received, send/receive function 802 determines if there are filtering instructions to be sent (e.g. to the sensors). If there are, send/receive function 802 sends the filtering instructions accordingly. If there are not, send/receive function 802 returns to block 902 to determine if there are source addresses to be received again.

As illustrated in FIG. 10, upon start up, analyzer 804 selects a source address for analysis. At block 1002, analyzer 804 constructs a spatial, a destination source address range, a migration, and/or timing distribution profile for the source address being analyzed, using the reported data. Recall that a spatial distribution profile addresses the network domain distribution profiles of the reported source addresses. Destination source address range profiles address the source address ranges of other packets being routed to other destination at the reporting location. Migration profiles address the rapidity the routing paths change for the reported source addresses, and the timing distribution profiles addresses the rapidity with which packets with the reported source addresses are issued. At block 1004, analyzer 804 compares the constructed S/D/M/T distribution profiles to reference S/D/M/T distribution profiles. As described earlier, the reference S/D/M/T distribution profiles may be an exemplary reference S/D/M/T distribution profile for a non-spoof source address in general, or it may be a historical S/D/M/T distribution profile of the source address under analysis in particular. At block 1006, analyzer 804 determines if the source address under analysis should be deemed as having spoof instances, i.e. at least some of the packets observed are to be deemed as having spoof source addresses. As described earlier, the determination may be made using any one of a number statistical techniques in deciding whether the constructed S/D/M/T distribution profile bears sufficient resemblance to the reference S/D/M/T distribution profile. If the source address is not to be deemed as having spoof instances, no actions are taken. The process returns to block 1002 for another source address to be analyzed. However, if the source address is to be deemed as having spoof instances, analyzer 804 notifies/alerts regulator 806 accordingly, block 1008.

Figure 11:
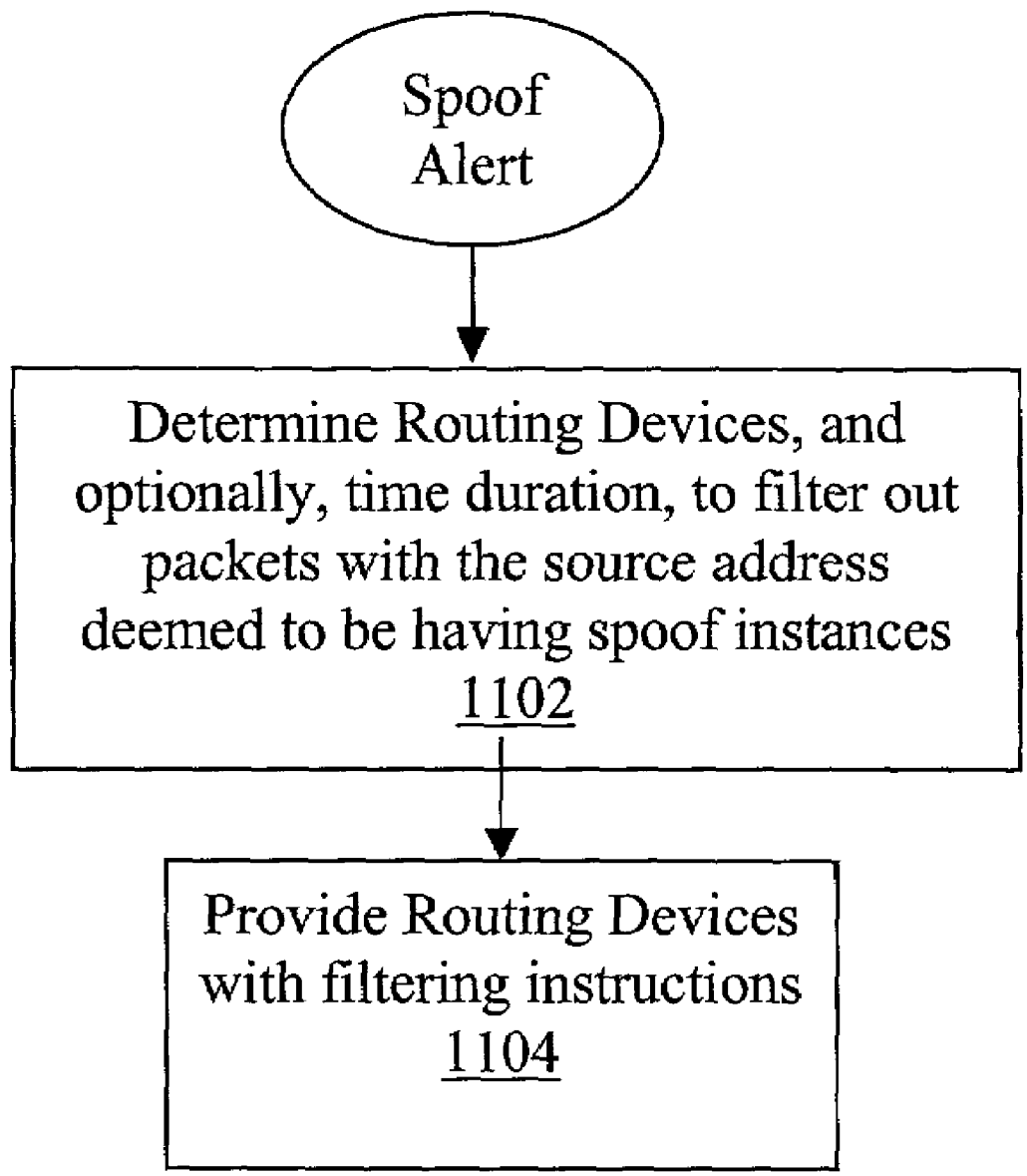

As illustrated in FIG. 11, upon receipt of a spoof source address alert for a source address, regulator 806 selects the boundary entry points (more specifically, the routing devices at these points) to filter out packets with the source address, 1102. As described earlier, in some embodiments, all boundary entry points may be selected, while in other embodiments, certain boundary entry points may be skipped, such as those known to be having a high likelihood of leading into the domains of network 100 where genuine instances of the source address are likely to be routed. Further, in some embodiments, regulator 806 also determines a time duration for the filtering operation to be in effect. The length of the duration may be selected based on any number of heuristic factors, block 1102. Upon making these determinations, regulator 806 provides the appropriate routing devices with the filtering instructions accordingly (e.g. through their corresponding sensors), block 1104. [As alluded to earlier, in some embodiments, the filtering instructions are manually applied to the instructed routing devices.]

Example Host Computer System

Figure 12:
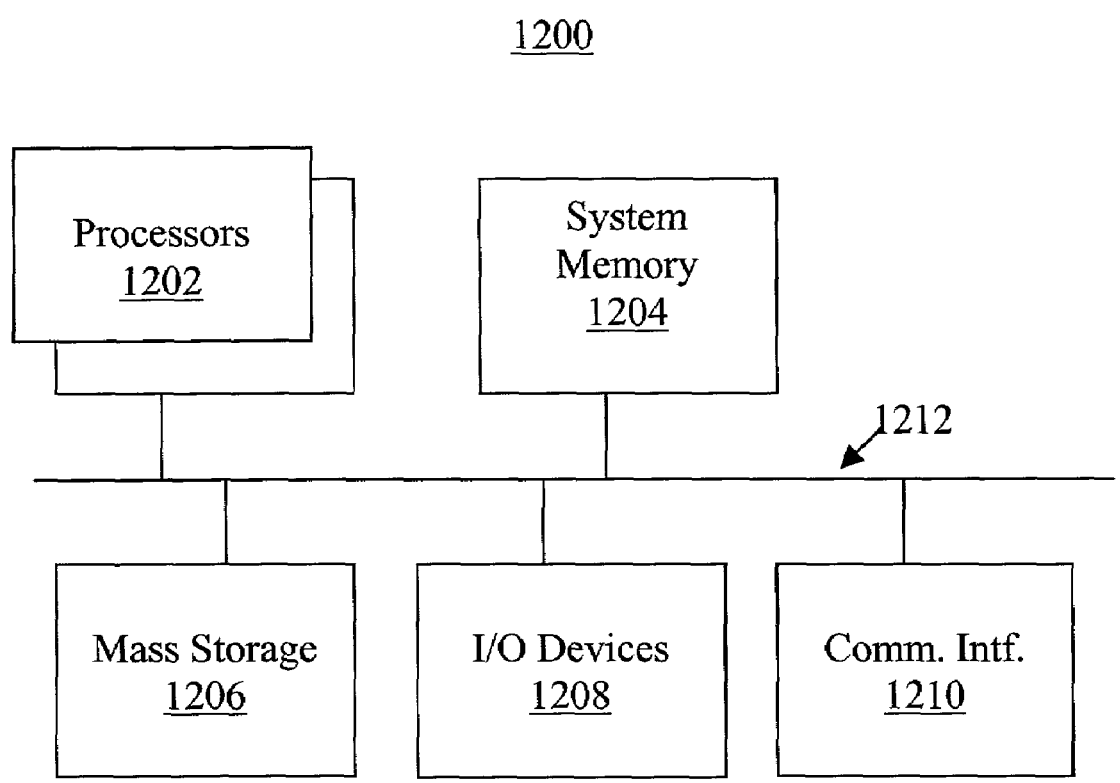
FIG. 12 illustrates an example computer system suitable for use to host a software implementation of a sensor or the director, in accordance with one embodiment.

FIG. 12 illustrates an example computer system suitable for use as either a host to a software implementation of a sensor, or the director in accordance with one embodiment. As shown, computer system 1200 includes one or more processors 1202 (typically depending on whether it is used as host to sensor or the director), and system memory 1204. Additionally, computer system 1200 includes mass storage devices 1206 (such as diskette, hard drive, CDROM and so forth), input/output devices 1208 (such as keyboard, cursor control and so forth) and communication interfaces 1210 (such as network interface cards, modems and so forth). The elements are coupled to each other via system bus 1212, which represents one or more buses. In the case of multiple buses, they are bridged by one or more bus bridges (not shown). Each of these elements perform its conventional functions known in the art. In particular, system memory 1204 and mass storage 1206 are employed to store a working copy and a permanent copy of the programming instructions implementing the sensor/director teachings of the present invention. The permanent copy of the programming instructions may be loaded into mass storage 1206 in the factory, or in the field, as described earlier, through a distribution medium (not shown) or through communication interface 1210 (from a distribution server (not shown). The constitution of these elements 1202-1212 are known, and accordingly will not be further described.

Conclusion and Epilogue

Thus, it can be seen from the above descriptions, a novel method and apparatus for fending off undesirable network traffic, including consistency based detection and filtering out of packets with spoof source addresses, has been described. The novel scheme assist in enabling the quality of service provided by a network node to be substantially ensured, including substantial nullification of denial of service attacks.

While the present invention has been described in terms of the above illustrated embodiments, those skilled in the art will recognize that the invention is not limited to the embodiments described. The present invention can be practiced with modification and alteration within the spirit and scope of the appended claims. For examples, as alluded to earlier, the present invention may be practiced with more or less sensors, more directors, and so forth. Thus, the description is thus to be regarded as illustrative instead of restrictive on the present invention.

What is claimed is:

1. A network comprising:
   a plurality of network nodes;
   a plurality of routing devices to route network traffics between selected ones of said network nodes; and
   a director coupled to said routing devices to determine whether selected instances of source addresses of packets routed by said routing devices are spoof source addresses, based at least in part on one or more consistency measures;
   wherein the director bases said determination on at least spatial distribution profiles of said source addresses, and in view of at least one reference source address spatial distribution profile.

2. The network of claim 1, wherein said at least one reference source address spatial distribution profile comprises at least a selected one of an exemplary spatial distribution profile for a non-spoof source address in general, and a historical spatial distribution profile for a particular source address.

3. A network comprising:
   a plurality of network nodes;
   a plurality of routing devices to route network traffics between selected ones of said network nodes; and
   a director coupled to said routing devices to determine whether selected instances of source addresses of packets routed by said routing devices are spoof source addresses, based at least in part on one or more consistency measures;
   wherein the director bases said determination on at least destination source address range (DSAR) distribution profiles of said source addresses, and in view of at least one reference DSAR distribution profile.

4. The network of claim 3, wherein said at least one reference DSAR distribution profile comprises at least a selected one of an exemplary DSAR distribution profile for a non-spoof source address in general, and a historical DSAR distribution profile for a particular source address.

5. A network comprising:
   a plurality of network nodes;
   a plurality of routing devices to route network traffics between selected ones of said network nodes; and
   a director coupled to said routing devices to determine whether selected instances of source addresses of packets routed by said routing devices are spoof source addresses, based at least in part on one or more consistency measures;
   wherein the director bases said determination on at least migration distribution profiles of said source addresses, and in view of at least one reference migration distribution profile.

6. The network of claim 5, wherein said at least one reference migration distribution profile comprises at least a selected one of an exemplary migration distribution profile for a non-spoof source address in general, and a historical migration distribution profile for a particular source address.

7. A network comprising:
   a plurality of network nodes;
   a plurality of routing devices to route network traffics between selected ones of said network nodes; and
   a director coupled to said routing devices to determine whether selected instances of source addresses of packets routed by said routing devices are spoof source addresses, based at least in part on one or more consistency measures;

wherein the director is further equipped to determine whether filtering actions are to be taken to filter out packets with source addresses having instances deemed to be spoof source addresses, and if filtering actions are to taken, where among said routing devices, said filtering actions are to be taken.

8. The network of claim 7, wherein the director bases said determination on at least timing distribution profiles of said source addresses, and in view of at least one reference source address timing distribution profile.

9. The network of claim 8, wherein said at least one reference source address timing distribution profile comprises at least a selected one of an exemplary timing distribution profile for a non-spoof source address in general, and a historical timing distribution profile for a particular source address.

10. The network of claim 7, wherein the director takes into consideration in making said where determination, where packets of non-spoof instances of a source address having instances deemed to be spoof source addresses are likely to be routed in said network.

11. The network of claim 7, wherein the director comprises a plurality of director devices cooperatively coupled to each other to jointly make said determination.

12. The network of claim 7, wherein the network further comprises a plurality of sensors, either integrally disposed in a subset of said routing devices or externally disposed and coupled to the subset of routing devices, to monitor and report on source addresses of packets routed through the subset of routing devices.

13. The network of claim 12, wherein the sensors are further equipped to facilitate application of desired source address based filtering on packets being routed through selected ones of said subset of routing devices.

14. A networking method comprising:
receiving information associated with source addresses of packets being routed to and from a plurality of network nodes of a network;
determining whether selected instances of said source addresses are spoof instances of said source addresses, based at least in part on one or more consistency measures; and
managing said network based at least in part on the results of said determination;
wherein said determination is made based at least in part on spatial distribution profiles of said source addresses, and in view of at least one reference source address spatial distribution profile.

15. The method of claim 14, wherein said determination comprises constructing said spatial distribution profiles of said source addresses.

16. The method of claim 14, wherein said determining comprises determining whether each of the spatial distribution profiles of the source addresses is within a resemblance tolerance limit when compared to each of the at least one reference source address spatial distribution profile.

17. The method of claim 14, wherein said at least one reference spatial distribution profile comprises at least a selected one of an exemplary spatial distribution profile for a non-spoof source address in general, and a historical spatial distribution profile for a particular source address.

18. The method of claim 14, wherein said determination is made based on at least timing distribution profiles of said source addresses, and in view of at least one reference source address timing distribution profile.

19. The method of claim 18, wherein said determining comprises constructing said timing distribution profiles of said source addresses.

20. The method of claim 18, wherein said determining comprises determining whether each of the timing distribution profiles of the source addresses is within a resemblance tolerance limit when compared to each of the at least one reference source address timing distribution profile.

21. The method of claim 18, wherein said at least one reference timing distribution profile comprises at least a selected one of an exemplary timing distribution profile for a non-spoof source address in general, and a historical timing distribution profile for a particular source address.

22. The method of claim 14, wherein said managing comprises determining whether filtering actions are to be taken in said network to filter out at least some packets having source addresses deemed to be having spoof instances, and if filtering actions are to be taken, where among a plurality of routing devices, said filtering actions are to be taken.

23. The method of claim 22, wherein said where determination comprises taking into consideration where packets of non-spoof instances of a source address having instances deemed to be spoof source addresses are likely to be routed in said network.

24. A networking method comprising:
receiving information associated with source addresses of packets being routed to and from a plurality of network nodes of a network;
determining whether selected instances of said source addresses are spoof instances of said source addresses, based at least in part on one or more consistency measures; and
managing said network based at least in part on the results of said determination;
wherein said determination is made based at least in part on destination source address range (DSAR) distribution profiles of said source addresses, and in view of at least one reference DSAR distribution profile.

25. The method of claim 24, wherein said determination comprises constructing said DSAR distribution profiles of said source addresses.

26. The method of claim 24, wherein said determining comprises determining whether each of the DSAR distribution profiles of the source addresses is within a resemblance tolerance limit when compared to each of the at least one reference source address DSAR distribution profile.

27. The method of claim 24, wherein said at least one reference DSAR distribution profile comprises at least a selected one of an exemplary DSAR distribution profile for a non-spoof source address in general, and a historical DSAR distribution profile for a particular source address.

28. A networking method comprising:
receiving information associated with source addresses of packets being routed to and from a plurality of network nodes of a network;
determining whether selected instances of said source addresses are spoof instances of said source addresses, based at least in part on one or more consistency measures; and
managing said network based at least in part on the results of said determination;
wherein said determination is made based at least in part on migration distribution profiles of said source addresses, and in view of at least one reference migration distribution profile.

29. The method of claim 28, wherein said determining comprises constructing said migration distribution profiles of said source addresses.

30. The method of claim 28, wherein said determining comprises determining whether each of the migration distribution profiles of the source addresses is within a resemblance tolerance limit when compared to each of the at least one reference source address migration distribution profile.

31. The method of claim 28, wherein said at least one reference migration distribution profile comprises at least a selected one of an exemplary migration distribution profile for a non-spoof source address in general, and a historical migration distribution profile for a particular source address.

32. An apparatus comprising:
   (a) a storage medium having stored therein a plurality of programming instructions designed to implement a director to receive reporting of information associated with source addresses of packets routed through a plurality of routing devices of a network, and to determine whether at least some instances of said source addresses are spoof instances based on at least spatial distribution profiles of said source addresses, and in view of at least one reference source address spatial distribution profile; and
   (b) a processor coupled the storage medium to execute the programming instructions.

33. The apparatus of claim 32, wherein said programming instructions are designed to be able to construct said spatial distribution profiles of said source addresses.

34. The apparatus of claim 32, wherein said programming instructions are designed to be able to determine whether each of the spatial distribution profiles of the source addresses is within a resemblance tolerance limit when compared to each of the at least one reference source address spatial distribution profile.

35. The apparatus of claim 32, wherein said programming instructions are designed to make said determination based on at least destination source address range (DSAR) distribution profiles of said source addresses, and in view of at least one reference source address DSAR distribution profile.

36. The apparatus of claim 35, wherein said programming instructions are designed to be able to construct said DSAR distribution profiles of said source addresses.

37. The apparatus of claim 35, wherein said programming instructions are designed to be able to determine whether each of the DSAR distribution profiles of the source addresses is within a resemblance tolerance limit when compared to each of the at least one reference source address DSAR distribution profile.

38. The apparatus of claim 32, wherein said programming instructions are designed to make said determination based on at least migration distribution profiles of said source addresses, and in view of at least one reference source address migration distribution profile.

39. The apparatus of claim 38, wherein said programming instructions are designed to be able to construct said migration distribution profiles of said source addresses.

40. The apparatus of claim 38, wherein said programming instructions are designed to be able to determine whether each of the migration distribution profiles of the source addresses is within a resemblance tolerance limit when compared to each of the at least one reference source address migration distribution profile.

41. The apparatus of claim 32, wherein said programming instructions are designed to make said determination based on at least timing distribution profiles of said source addresses, and in view of at least one reference source address timing distribution profile.

42. The apparatus of claim 41, wherein said programming instructions are designed to be able to construct said timing distribution profiles of said source addresses.

43. The apparatus of claim 41, wherein said programming instructions are designed to be able to determine whether each of the timing distribution profiles of the source addresses is within a resemblance tolerance limit when compared to each of the at least one reference source address timing distribution profile.

44. The apparatus of claim 32, wherein said programming instructions are designed to be able to determine whether filtering actions are to be taken in said network to filter out at least some packets having source addresses deemed to be having spoof instances, and if filtering actions are to be taken, further determine where among a plurality of routing devices, said filtering actions are to be taken.

45. The apparatus of claim 44, wherein said programming instructions are designed to take into consideration where packets of non-spoof instances of a source address having instances deemed to be spoof source addresses are likely to be routed in said network, when making said where determination.

* * * * *